United States Patent
Nishida et al.

[11] Patent Number: 5,110,273
[45] Date of Patent: May 5, 1992

[54] SCROLL-TYPE FLUID MACHINE WITH AN IMPROVED JOURNAL BEARING

[75] Inventors: Mitsuhiro Nishida; Masumi Arita, both of Fukuoka, Japan

[73] Assignee: Mitsubishi Denki K.K., Tokyo, Japan

[21] Appl. No.: 494,347

[22] Filed: Mar. 16, 1990

[30] Foreign Application Priority Data

Aug. 2, 1989 [JP] Japan ................... 1-200666

[51] Int. Cl.⁵ .................... F01C 1/04; F01C 21/04; F16C 33/66
[52] U.S. Cl. .................... 418/55.6; 418/188; 384/537
[58] Field of Search .......... 418/55.1, 55.3, 55.4, 418/55.6, 188, 104; 384/477, 484, 537, 540

[56] References Cited
U.S. PATENT DOCUMENTS 2,368,549 1/1945 Kendall .................. 384/537
3,295,898 1/1967 Finzel .................... 384/537
4,973,232 11/1990 Etou et al. ................ 418/55.6

FOREIGN PATENT DOCUMENTS 58-59392 4/1983 Japan.
63-295888 12/1988 Japan.

Primary Examiner—John J. Vrablik
Attorney, Agent, or Firm—Sughrue, Mion, Zinn, Macpeak & Seas

[57] ABSTRACT

A scroll-type fluid machine has a drive scroll which is rotatably supported by a novel bearing arrangement. The bearing arrangement includes a bearing housing which is detachably mounted on a casing of the fluid machine. A journal bearing which rotatably supports a drive shaft of the drive scroll is secured inside the bearing housing. An oil seal surrounds the drive shaft beneath the bearing, and grease fills the space between the bearing and the oil seal.

4 Claims, 1 Drawing Sheet

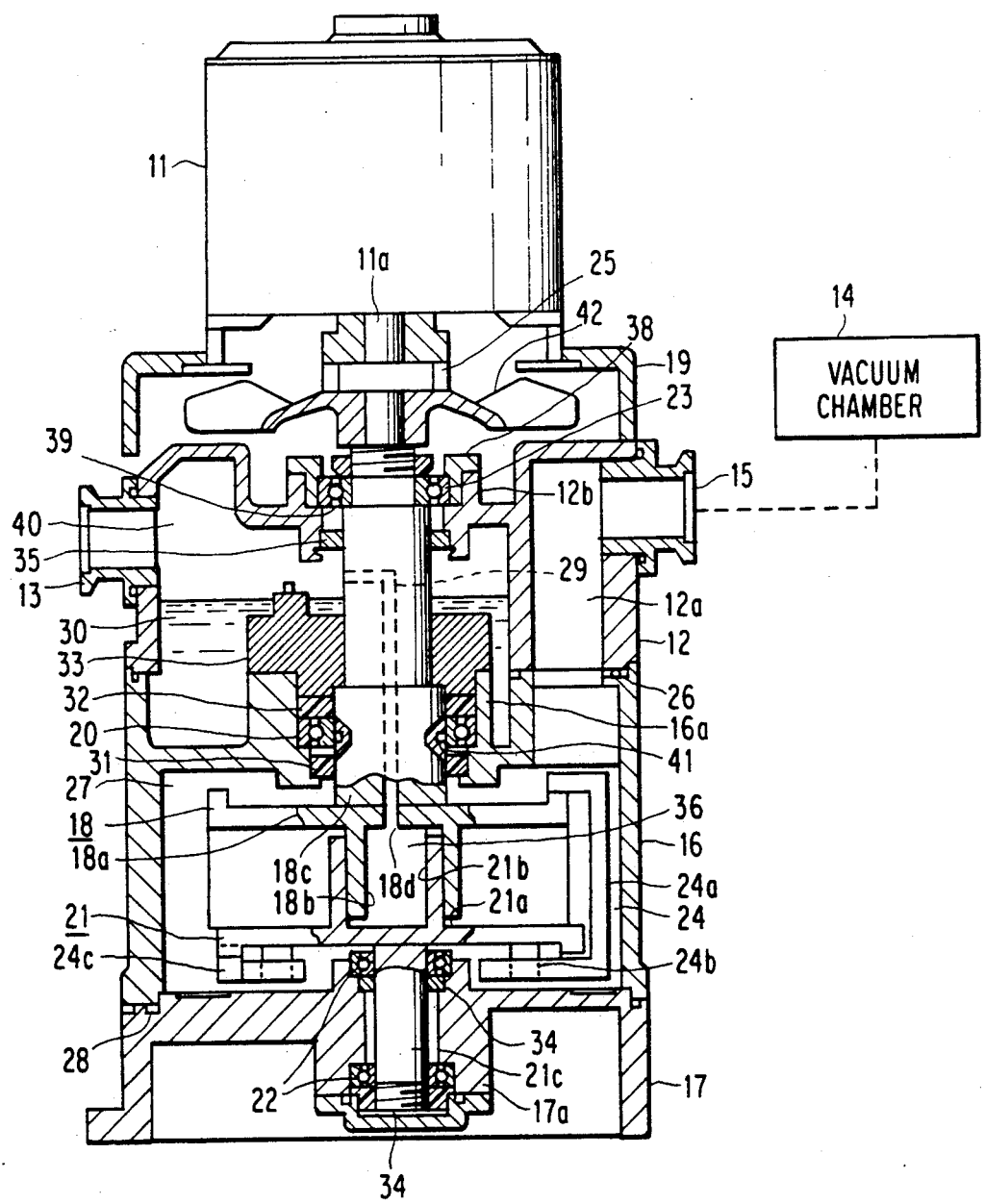
FIGURE

SCROLL-TYPE FLUID MACHINE WITH AN IMPROVED JOURNAL BEARING

BACKGROUND OF THE INVENTION

This invention relates to a scroll-type fluid machine having an improved journal bearing for the shaft of one of the scrolls. More particularly but not exclusively, it relates to a scroll-type vacuum pump of the type having two rotating scrolls.

A scroll-type fluid machine is a positive displacement machine having two interfitting elements usually referred to as scrolls. Each scroll includes a disk-shaped end plate and a thin-walled member, referred to as a spiral wrap, which projects perpendicularly from one surface of the end plate and curves outwards from the center of the end plate in the shape of an involute or other type of spiral. The two scrolls are disposed with the end plates parallel and the spiral wraps interfitting with one another so that they are in line contact at a plurality of locations. The surfaces of the end plates and the spiral wraps define a plurality of spiral compression chambers between the points of contact between the spiral wraps. If the scrolls are rotated with respect to one another in the proper direction while maintaining the line contact between the spiral wraps, the compression chambers are gradually moved towards the centers of the scrolls with an accompanying decrease in volume. A working fluid is introduced into the compression chambers via a suction port formed in the outer periphery of one of the scrolls and is then removed at a higher pressure from a discharge port formed in the center of the end plate of one of the scrolls.

Each of the scrolls is equipped with a shaft by means of which the scroll is rotatably supported. The shafts are supported by journal bearings secured to casings which enclose the scrolls. However, because the bearings are secured to the casings, it is difficult to disassemble the scrolls of a conventional scroll-type fluid machine when the machine needs to be repaired. It is also difficult to adjust the positions of the bearings.

SUMMARY OF THE INVENTION

Accordingly, it is an object of the present invention to provide a scroll-type fluid machine having an improved journal bearing which can be easily adjusted and repaired.

A scroll-type fluid machine according to the present invention has a pair of scrolls which are housed inside a first casing. One of the scrolls has a shaft which extends into a second casing which adjoins the first casing. The shaft is rotatably supported by a novel bearing arrangement including a bearing housing which is detachably mounted on the second casing and a journal bearing which is secured to the bearing housing and rotatably supports the drive shaft. The journal bearing and the bearing housing can be easily removed from the second casing as a unit, so disassembly and maintenance are simplified. The bearing arrangement also includes an oil seal which surrounds the shaft and grease which fills the space between the journal bearing and the shaft. The grease lubricates the oil seal and maintains its sealing effectiveness.

In a preferred embodiment, the fluid machine is of the type having a drive scroll and a driven scroll which are rotatably supported for rotation about eccentric axes, and the novel bearing arrangement supports a drive shaft for the drive scroll. However, the present invention is not limited to a fluid machine of this type, and the novel bearing arrangement can be used to support a shaft of the driven scroll. The present invention can also be in the form of a fluid machine having a moving scroll and a stationary scroll.

BRIEF DESCRIPTION OF THE DRAWING

The sole drawing is a vertical cross-sectional view of an embodiment of a scroll-type fluid machine according to the present invention.

DESCRIPTION OF THE PREFERRED EMBODIMENT

A preferred embodiment of a scroll-type fluid machine according to the present invention will now be described while referring to the accompanying drawing. The illustrated embodiment is in the form of a vacuum pump, but the present invention is not restricted to use as a pump. As shown in the FIGURE, this embodiment includes a hollow upper casing 12, a hollow lower casing 16, and a base 17 which are mounted one atop the other. A seal is formed between the bottom surface of the upper casing 12 and the top surface of the lower casing 16 by an O-ring 26 which is mounted in a groove formed in the lower casing 16. Similarly, a seal is formed between the bottom surface of the lower casing 16 and the top surface of the base 17 by an O-ring 28 which is mounted in a groove formed in the top surface of the base 17.

The inside of the lower casing 16 defines a scroll chamber 27 in which a drive scroll 18 and a driven scroll 21 are housed. The drive scroll 18 includes a disk-shaped base plate 18a, a spiral wrap 18b which extends perpendicularly from one surface of the base plate 18a, and a drive shaft 18c which extends perpendicularly from the opposite surface of the base plate 18a. Similarly, the driven scroll 21 includes a disk-shaped base plate 21a, a spiral wrap 21b, and a shaft 21c. The two base plates 18a and 21a are disposed parallel to one another, and the two spiral wraps 18b and 21b are interfit so as to define one or more compression chambers 36 therebetween. A discharge port 18d is formed at the center of the base plate 18a of the drive scroll 18.

The drive shaft 18c of the drive scroll 18 extends from the scroll chamber 27 into the upper casing 12 through a hollow boss 16a of the lower casing 16. The lower portion of the drive shaft 18c is rotatably supported by a lower bearing 20 which is mounted inside the boss 16a. Oil seals 31 and 32 are disposed on either side of the lower bearing 20.

The upper end of the drive shaft 18c of the drive scroll 18 is rotatably supported by a novel bearing arrangement according to the present invention. The bearing arrangement includes an upper journal bearing 23 having an outer race which is secured to the inside of a bearing housing 38. The bearing housing 38 is detachably mounted inside a hollow boss 12b formed at the center of the upper surface of the upper casing 12. An oil seal 35 is disposed around the drive shaft 18c on the underside of the top surface of the upper casing 12, and the space between the upper bearing 23 and the oil seal 35 is filled with grease 39, which lubricates the oil seal 35 and increases its effectiveness.

An electric motor 11 is mounted atop the upper casing 12 by means of a motor support 19. The motor 11 has an output shaft 11a which is connected to the drive shaft 18c of the drive scroll 18 by a coupling 25. A cooling fan 42 for cooling the motor 11 is mounted on the drive shaft 18c just below the coupling 25.

The upper portion of the upper casing 12 is equipped with a suction port 15 and a discharge port 13. The suction port 15 is connected with the inside of the scroll chamber 27 by a suction passageway 12a which is formed inside the upper casing 12 and is separated from the other portions of the inside of the upper casing 12. The remainder of the inside of the upper casing 12 defines a discharge chamber 40 which communicates with the discharge port 13. The lower portion of the discharge chamber 40 is filled with lubricating oil 30. The discharge port 18d of the drive scroll 18 is connected with the discharge chamber 40 by a discharge passageway 29 which extends axially through the drive shaft 18c of the drive scroll 18 and then extends radially outwards to the peripheral surface of the drive shaft 18c above the level of the lubricating oil 30. The lower journal bearing 20 for the drive shaft 18c of the drive scroll 18 is immersed in the lubricating oil 30. The oil 30 is prevented from leaking past the lower bearing 20 by the oil seals 31 and 32 and by an O-ring 41 which is mounted in a circumferential groove on the outer peripheral surface of the drive shaft 18c.

When the illustrated embodiment is to be used as a vacuum pump, the suction port 15 is connected to a vacuum chamber 14 which is to be evacuated.

An oil pump 33 is mounted on the boss 16a of the lower casing 16. The pump 33 is driven by the rotation of the drive shaft 18c of the drive scroll 18.

The shaft 21c of the driven scroll 21 is rotatably supported by journal bearings 22 which are mounted inside a hollow boss 17a formed at the center of the base 17. Each of the bearings 22 is adjoined by an oil seal 34. The shaft 21c of the driven scroll 21 is eccentric with respect to the drive shaft 18c of the drive scroll 18. The rotation of the drive scroll 18 is transmitted to the driven scroll 21 by means of a conventional Oldham coupling 24. The Oldham coupling 24 includes a connecting arm 24a which is secured to the base plate 18a of the drive scroll 18, a ring 24c which is secured to the base plate 21a of the driven scroll 21, and keys 24b which slidingly connect the connecting arm 24a to the ring 24c.

When the motor 11 is operated, the drive scroll 18 is rotated about the center of its drive shaft 18c, while the driven scroll 21 is rotated about the center of its shaft 21c by the rotational force transmitted to the driven scroll 21 by the Oldham coupling 24. As a result, the two scrolls 18 and 21 rotate synchronously about eccentric axes. As they rotate, the compression chambers 36 which are formed between the spiral wraps of the two scrolls are gradually moved from the radially outer portions to the radially inner portions of the scrolls with an accompanying decrease in volume, and pumping action is performed. The pumping action sucks gas from the vacuum chamber 14 through the suction port 15 and the suction passageway 12a and into the scroll chamber 27, from where the gas is sucked into the compression chambers 36 of the scrolls. The gas is then compressed by the rotation of the scrolls and is discharged through the discharge port 18d and the discharge passageway 29 into the discharge chamber 40. The compressed gas is then discharged from the pump through the discharge port 13.

The oil pump 33 supplies lubricating oil 30 to the inside of the compression chambers 36. The oil 30 seals the gaps between adjoining surfaces of the spiral wraps 18b and 21b and between the ends surfaces of the spiral wraps and the inner surfaces of the base plates 18a and 21a which confront the end surfaces. By preventing leaks of compressed gas, the oil 30 increases the pumping efficiency of the scrolls. The oil 30 which enters the compression chambers 36 is discharged together with compressed gas into the discharge chamber 40, where it separates from the gas and falls back to the bottom of the upper casing 12.

A portion of the lubricating oil 30 which is supplied to the compression chambers 36 is discharged to the inside of the scroll chamber 27 and accumulates in the bottom of the scroll chamber 27, where it lubricates the bearings 22 for the shaft 21c of the driven scroll 21 and the Oldham coupling 24. When the oil 30 reaches a certain level in the scroll chamber 27, it is sucked into the compression chambers 36 of the scrolls. Therefore, the oil can be maintained at a substantially constant level which is high enough to lubricate the Oldham coupling.

When it is necessary to repair a vacuum pump according to the present invention, the upper bearing 23 and the bearing housing 38 can be easily removed from the boss 12b of the upper casing 12 as a single unit. Therefore, disassembly of the pump is greatly simplified. This arrangement also makes it easy to adjust the upper bearing 23. Furthermore, the layer of grease 39 between the upper bearing 23 and oil seal 35 lubricates the oil seal 35 and maintains its effectiveness.

What is claimed is:

1. An arrangement for a scroll-type fluid machine comprising:
    a first scroll having a base plate, a shaft which extends from one surface of the base plate, and a spiral wrap which extends from another surface of the base plate;
    a second scroll having a base plate and a spiral wrap which extends from a surface of the base plate and interfits with the spiral wrap of the first scroll to define a compression chamber;
    a first casing which houses the first and second scrolls;
    a second casing which adjoins the first casing, the shaft of the first scroll extending into the second casing; and
    a shaft bearing arrangement which rotatably supports the shaft of the first scroll and which comprises a bearing housing which is detachably mounted on the second casing, a journal bearing which is secured to the bearing housing and rotatably supports the shaft of the first scroll, an oil seal which is mounted on the second casing and surrounds the shaft of the first scroll, and grease which is disposed between the journal bearing and the oil seal.

2. A scroll arrangement as claimed in claim 1, further comprising:
    a shaft which extends from a surface of the base plate of the second scroll and is eccentric to the shaft of the first scroll;
    a bearing which rotatably supports the shaft of the second scroll; and
    means for transmitting rotation of one scroll to the other scroll.

3. A scroll arrangement as claimed in claim 2, further comprising means for rotating one of the shafts.

4. A scroll-type fluid machine comprising:
    a drive scroll having a base plate, a drive shaft which extends from one side of the base plate, and a spiral wrap which extends from another side of the base plate;

a driven scroll having a base plate, a driven shaft which extends from one side of the base plate and is eccentric with respect to the drive shaft of the drive scroll, and a spiral wrap which extends from another side of the base plate and interfits with the spiral wrap of the drive scroll to define a compression chamber;

means for transmitting rotation of the drive scroll to the driven scroll;

a first casing which houses the drive scroll and the driven scroll;

a second casing which adjoins the first casing, the drive shaft of the drive scroll extending into the second casing;

oil which partially fills the second casing;

a bearing which rotatably supports the shaft of the driven scroll;

a first drive shaft bearing which rotatably supports the drive shaft of the drive scroll and is immersed in the oil;

a bearing housing which is detachably mounted on the upper casing above the level of the oil;

a second drive shaft bearing which is secured inside the bearing housing and rotatably supports the drive shaft of the drive scroll;

an oil seal which is mounted on the upper casing and surrounds the drive shaft of the drive scroll; and grease which fills a space between the second drive shaft bearing and the oil seal.

* * * * *